United States Patent Office.

CHARLES A. F. DIETZ, OF NEW YORK, N. Y.

Letters Patent No. 74,205, dated February 11, 1868.

IMPROVED MEDICAL COMPOUND.

The Schedule referred to in these Letters Patent and making part of the same.

TO ALL WHOM IT MAY CONCERN:

Be it known that I, CHARLES A. F. DIETZ, of No. 76 First street, New York, county and State of New York, have invented a new and improved Medical Compound; and I do hereby declare that the following is a full, clear, and exact description thereof, which will enable those skilled in the art to make and use the same.

This invention relates to a compound which is composed of an extract of water-cresses, and of an extract of horse-radish, both extracts being made with white California wine, and which has proved to be a valuable and effective remedy against all consumptive diseases.

The extracts which I use in making my compound are prepared as follows: I take water-cresses and horse-radish, each in a separate vessel, pound and crush the same well by any suitable means, and then add white California wine in the following proportions: Water-cresses, one pound; wine, four pounds; and horse-radish, one pound; wine, ten pounds.

Each of these mixtures is then filled in a vessel, which is hermetically sealed, and exposed for three or four hours to a high heat in an oven. By the heat and pressure, all the available parts contained in the water-cresses and in the horse-radish are extracted, and intimately combined with the wine. After the vessels have been removed from the oven, they are left to cool, and the solid parts contained in the liquids are removed by filtering. The clear liquid extracts thus obtained are then mixed in the following proportion: Extract of water-cresses, two parts; extract of horse-radish, one part; and the compound is ready for use.

My compound is of remarkable effect in all consumptive diseases. It invigorates the whole system, and in many cases it cures consumption which baffles the effect of ordinary remedies.

What I claim as new, and desire to secure by Letters Patent, is—

A medical compound, made as herein described.

This specification signed by me, this 3d day of January, 1868.

CHAS. A. F. DIETZ.

Witnesses:
W. HAUFF,
GUSTAV BERG.